United States Patent [19]

Kobayashi et al.

[11] 4,187,815
[45] Feb. 12, 1980

[54] INTAKE FUEL MIXTURE HEATING SYSTEM FOR INTERNAL COMBUSTION ENGINE

[75] Inventors: Toshihiko Kobayashi; Toshinari Oonishi, both of Toyota, Japan

[73] Assignee: Toyota Jidosha Kogyo Kabushiki Kaisha, Aichi, Japan

[21] Appl. No.: 913,053

[22] Filed: Jun. 6, 1978

[30] Foreign Application Priority Data

Mar. 27, 1978 [JP] Japan .................. 53/34105

[51] Int. Cl.² ........................................... F02M 31/00
[52] U.S. Cl. ..................... 123/122 H; 123/122 AC; 123/122 AB; 236/101 D; 236/101 C
[58] Field of Search .................. 123/122 AC, 122 AB, 123/122 H; 251/305, 306; 137/468; 165/40; 236/101 D, 101 C

[56] References Cited

U.S. PATENT DOCUMENTS

| | | | |
|---|---|---|---|
| 1,258,910 | 3/1918 | Kinney | 123/122 H |
| 2,226,011 | 12/1940 | Murphy | 123/122 H |
| 2,819,025 | 1/1958 | Else | 123/122 H |
| 3,011,488 | 12/1961 | Toepel | 123/122 H |
| 3,951,116 | 4/1976 | Nakada | 123/122 AB |

*Primary Examiner*—Ronald H. Lazarus
*Attorney, Agent, or Firm*—Toren, McGeady and Stanger

[57] ABSTRACT

The intake fuel charge of an internal combustion engine is heated by utilizing the heat from the exhaust gases which are controlled by a valve mounted on a shaft having a counterweight secured to the shaft to control rotation thereof. A stopper which is engaged by the counterweight is provided for limiting the extent of rotation of the shaft and a spiral bimetallic member is arranged with its inner end secured to the shaft and with its outer end adapted to engage the stopper during engine warm up at relatively low ambient temperature conditions. An engagement member is mounted on the bimetallic member to engage the stopper when the second end of the bimetallic member moves in the direction opposite the direction whereby it would normally engage the stopper. The engagement member may be mounted a distance spaced from the outer end or it may be secured in back-to-back relationship with a second stopper member being provided.

6 Claims, 6 Drawing Figures

INTAKE FUEL MIXTURE HEATING SYSTEM FOR INTERNAL COMBUSTION ENGINE

BACKGROUND OF THE INVENTION

1. Field of the Invention

The present invention relates generally to internal combustion engines and more particularly to a system for heating the intake fuel mixture of the engine by utilizing heat from the exhaust gases for this purpose. More specifically, the invention relates to a heating system which is adapted to enhance the atomization of the fuel or mixture charge in the intake manifold during low-temperature engine conditions.

2. Description of the Prior Art

It has been known in the past to provide a heating system for heating the intake fuel mixture or charge of an internal combustion engine for the general purpose of enhancing atomization of fuel flowing in the intake manifold during low-temperature engine operating conditions.

Such systems have operated to utilize the heat from the exhaust gases emitted from the engine. In this regard, continued heating of the intake manifold after engine warm up operation will cause a temperature rise in the flow chamber of the engine carburetor. In order to overcome this disadvantage or shortcoming in such systems, there is provided a heat control valve for controlling the flow rate of the exhaust gases in response to the temperature of the engine.

Detection of the engine temperature is normally achieved by utilization of a spiral bimetallic member. Normally, in a spiral bimetallic member of this type, one end of the bimetallic member is secured to a shaft of the heating control valve and the other end of the bimetallic member is secured at a given position on the exhaust pipe. As a result of this, other problems may arise in that a limitation is imposed on the extent of the reversible deformation of the spiral bimetallic member. As a result, in a case where the ambient temperature is excessively high, high stresses are likely to be imposed on the spiral bimetallic member resulting in an irreversible or permanent deformation of the member. This will occur because the spiral bimetallic member is compressed in a specific direction to a contour which causes the member to go out of roundness. This in turn will hamper the normal or proper functioning of the heating control valve. Additionally, the time duration over which the heating control valve is shifted from one valve position to another should be shortened or minimized and therefore a balance weight is secured to the shaft of the heat control valve. It follows from this that in order to prevent irreversible or permanent deformation of the spiral bimetallic member, particularly in a case where the member is of an open ended configuration as opposed to a closed end configuration, there must occur repeated cycles of abutement of the counter-weight or balance-weight on the stopper due to vibrations of the vehicle. This creates an undesirable noise and gives rise to further disadvantage.

SUMMARY OF THE INVENTION

It is a principal object of the present invention to provide a heating system for the intake fuel mixture or charge of an internal combustion engine whereby there is avoided irreversible or permanent deformation of a spiral bimetallic member thereby ensuring proper functioning of a heat control valve of such a heating system with freedom from unwanted noise.

It is a further object of the invention to provide a heating system of this type wherein provision is made for preventing the transfer or transmission of heat from the exhaust manifold of the engine to the spiral bimetallic member.

In accordance with the present invention there is provided a system for heating the intake fuel mixture of an internal combustion engine which comprises a valve for controlling the flow of exhaust gases to the intake manifold where the fuel intake charge is heated. The valve is mounted on a rotatable shaft which has a counter-weight secured thereto and a stopper is also provided for engagement with the counter-weight in order to limit the extent of rotation thereof and, consequently, of the valve shaft. A spiral bimetallic member is provided with its inner ends secured to the valve shaft and with its other end moveable in response to thermal conditions. The other or outer end of the spiral bimetallic member is arranged to abut the stopper during low temperature engine conditions, i.e. before the completion of engine warm up, and an engagement member is attached to the bimetallic member at a point spaced from the outer end thereof to abut the stopper when ambient temperature conditions exceed a given temperature level.

Alternatively, in another form of the invention, the engagement means may be secured to the outer end of the bimetallic member in a back-to-back relationship with a second stopper member being provided spaced from the first stopper member so that movement of the outer end in one direction will cause engagement thereof with the first stopper member while movement in the opposite direction will cause engagement thereof with the second stopper member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
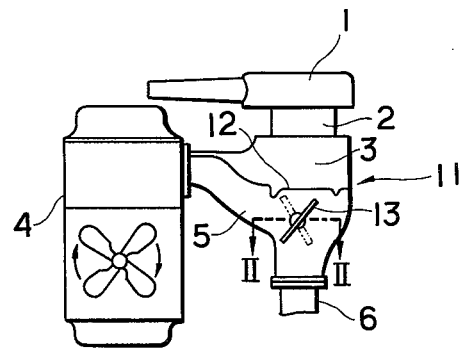
FIG. 1 is a schematic view showing an outline of a fuel intake mixture-charge heating system of the type generally referred to herein.

Referring now to the drawings, wherein like reference numerals refer to similar parts throughout the various figures thereof, there is shown a fuel intake mixture heating system for an internal combustion engine in accordance with the present invention. In the system of the present invention, air which has been introduced under suction through an air cleaner 1 is supplied, together with fuel from a carburetor 2, by means of an intake manifold 3 to a combustion chamber of an engine 4. Exhaust gases from the combustion chamber are delivered and discharged through an exhaust manifold 5 and an exhaust pipe 6 to the atmosphere. A fuel intake mixture-charge heating device 11 is positioned between the intake manifold 3 and the exhaust manifold 5. The system operates to control heating of the fuel intake mixture-charge which is being delivered to the intake manifold 3. This heating occurs in a heating portion 12 with the aid of a heating valve control 13.

More specifically, the control valve 13 operates to control the flow of exhaust gases in order thereby to control the heat transmission to the fuel intake mixture charge. When the control valve 13 assumes its closed position shown by a solid line in FIG. 1, i.e. when the control valve 13 permits the delivery of exhaust gases to the heating portion 12, the exhaust gases are deflected by means of the control valve 13 and operate to heat the intake manifold in the heating portion 12. Conversely, when the control valve 13 is moved to assume an open position, shown by a chain dotted line in FIG. 1, exhaust gases are not delivered to the heating portion 12 and as a result the intake manifold 3 will not be heated.

Figure 2:
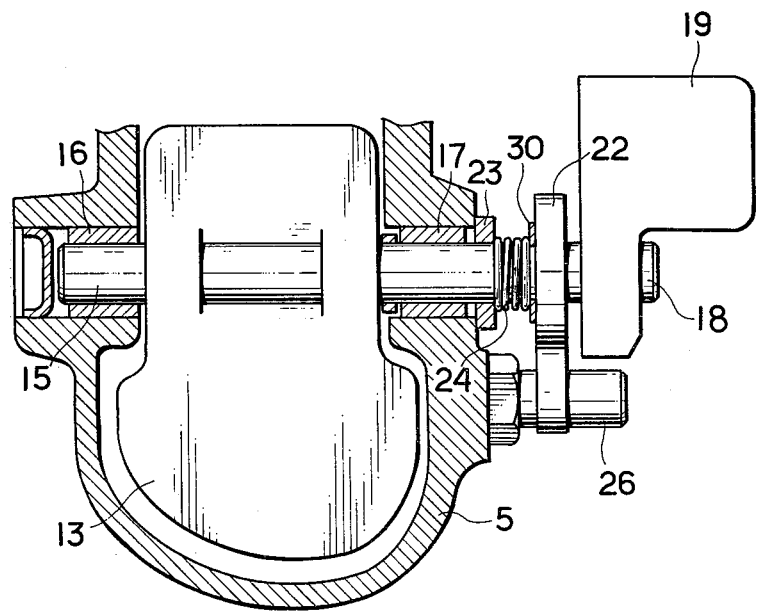
FIG. 2 is a cross sectional view of an intake fuel mixture-charge heating system according to the present invention, the view of the FIG. 2 being taken along the line II—II of FIG. 1.
Figure 3:
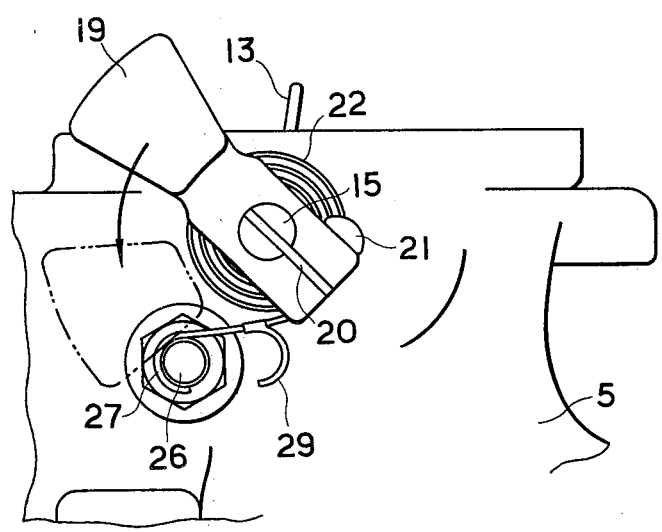
FIG. 3 is a side view of the heating system in accordance with the present invention.

As shown in FIG. 2, the valve 13 is welded or otherwise affixed to a shaft 15 which is journaled in bushes 16, 17 at opposite ends thereof, respectively. The bushes 16, 17 are rigidly supported on the exhaust manifold 5. The shaft 15 is formed at one end thereof with an extended portion 18 which extends outwardly beyond the bush 17 a given distance. As shown in FIG. 3, a counterweight 19 is rigidly secured to the extended portion 18 of the shaft by means of a cotter pin 20 and a screw 21. A spring 24 is confined between the exhaust manifold 5 and a spiral bimetallic member 22, with the spring being held in place by means of a pair of washers 23, 30. Thus, the washer 23 is spring biased against the exhaust manifold 5 and as a result the washer 23 operates to prevent leakage of exhaust gases past the shaft 15.

Figure 4:
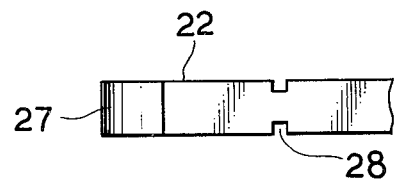
FIG. 4 is a view illustrating a circumferential groove defined in the surface of a spiral bi-metallic member of the system of the present invention.
Figure 5:
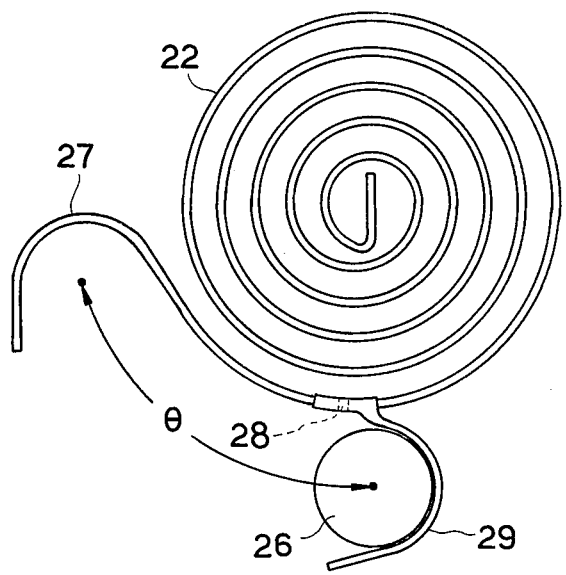
FIG. 5 is a plan view illustrating one embodiment of the present invention wherein the degree of movement of the bimetallic member is represented in terms of a rotational angle of the other end of the bimetallic member with respect to the center thereof, together with an open, hooked engaging portion secured to the bimetallic member.

A stopper 26, as seen in FIG. 3, is secured to the exhaust manifold 5 at a given position in order to limit the extent of movement of the counterweight 19 thereby to limit the extent of rotation of the shaft 15. The outer end of the spiral bimetallic member 22 is shaped in the form of an open hook 27 which is adapted to abut and engage the stopper 26. A circumferential groove 28 is provided in the surface of the bimetallic member 22 at a position spaced a given distance from the open hook 27 thereof, as best seen in FIGS. 4 and 5. An engaging member 29, also formed in the shape of an open hook, is secured to the bimetallic member 22 with the aid of the circumferential groove 28. In this respect, the engaging member 29 is preferably made of a material having a relatively low thermal conductivity.

It should be noted, however, that the bimetallic member is made of a metal forming an outer layer thereof of a higher coefficient of linear expansion with a metal forming the inner layer being of a lower coefficient of linear expansion so that in response to ambient temperature the radius of curvature of the bimetallic member 22 is reduced during increasing temperature and the radius is increased during decreasing temperature. Thus, the hook 27 at the outer end of the bimetallic member 22 will be moved outwardly therefrom during lower ambient temperatures. However, during increasing ambient temperature, the hook 27 will be pulled back inwardly of the bimetallic member 22 and the hook 29 will, when the end 27 moves in this direction, operate to engage the stopper 26.

During low temperature engine operation, i.e. prior to completion of engine warm up, the outer end of the bimetallic member with the hook 27 will engage the stopper 26. As a result, the heating control valve 13 remains in its closed position and the exhaut gases will be deflected by means of the valve 13 in order thereby to be delivered to the heating portion 12. Thus, the intake manifold 3 will be heated and the intake fuel mixture or mixture charge in the intake manifold will be better atomized thereby resulting in improved engine operation during engine warm up.

This will have the effect of reducing the amount of harmful constituents in the exhaust gases below the pollutants which would normally be found in such exhaust gases in an engine operating at lower ambient temperature.

As the temperature of the engine is increased, the ambient temperature of the spiral bimetallic member 22 will be increased so that the radius of curvature of the bimetallic member 22 will be decreased, in accordance with the foregoing description thereof. Accordingly, when the engine reaches a given temperature level, a counterclockwise torque or force will be developed from the counterweight 19 which will act upon the shaft 15 thereby overcoming a clockwise torque or force produced by means of the spiral bimetallic member 22. This will act on the shaft 15 with the result that the shaft is rotated in a counterclockwise direction until the counterweight 19 abuts the stopper 26. The heating control valve 13 will assume its open position. As a result, the supply of exhaust gases to the heating portion 12 is interrupted.

Even after the control valve 13 has been brought to its open position, the ambient temperature of the spiral bimetallic member 22 will continue to increase so that the radius of curvature of the member 22 is reduced. Thus, the hooked end 27 will move a distance and be detached from the stopper 26. As a result, the spiral bimetallic member 22 will no longer be restricted in its movement by the stopper 26.

When the radius of curvature of the spiral bimetallic member 22 is reduced to a given extent, i.e. when the hooked end 27 of the bimetallic member 22 is moved a given distance represented in terms of a rotational angle taken with respect to the center of the spiral bimetallic member 22 as shown in FIG. 5, the hooked portion 29 thereof will abut and engage the stopper 26 on the side opposite the side of the stopper normally engaged by the hook 27. Thus, it will be seen that the movement of the outer end of the bimetallic member 22 will be limited in a rather rigid and firm manner. This mode of operation will firmly hold the shaft 15 so that the counterweight 19 secured thereto will have its rotation impeded.

Ultimately, this will develop prevention of noise stemming from the periodic impingement of the counterweight 19 on the stopper 26.

It is also found to be advantageous to make the hook or engaging member 29 from a material or metal which exhibits a low degree of thermal conductivity. In this manner, a lower degree of heat transfer will occur from the stopper 26 to the spiral bimetallic member 22 thereby, in turn, reducing the effects of thermal influence of the exhaust gases.

Figure 6:
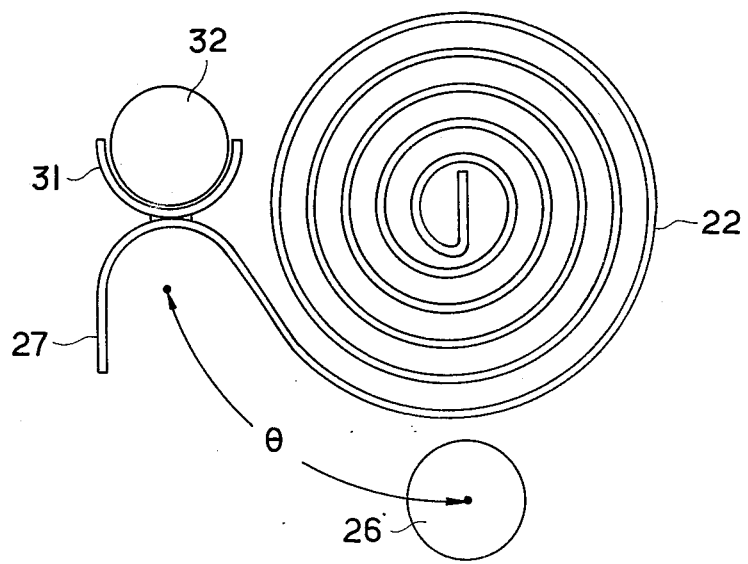
FIG. 6 is a view similar to FIG. 5 wherein there is depicted a modification of the arrangement of the outer end of the bimetallic member wherein two stopper members are provided.

FIG. 6 depicts a second embodiment of the invention. In FIG. 6, like parts are identified with similar reference numerals in common with those set forth in FIG. 3. Thus, duplicate descriptions will be avoided. In the embodiment of FIG. 6, the engaging member or hook 29 is not provided but there is provided instead a hook engaging member 31 which is secured to the open hook 27 at the end of the spiral bimetallic member in back-to-back relationship therewith. Accordingly, the direction of the hook or engaging member 31 will be found to be opposite to that of the hook 27. In this embodiment, a second stopper 32 is provided at a position spaced a certain distance from the stopper 26 and from the hook 27. The stopper 32 is arranged to be engaged by the hooked engaging member 31. When the heating control valve 13 assumes its open position whereby the radius of curvature of the spiral bimetallic member 22 is reduced, then the hooked engaging member 31 of the bimetallic member 22 will be moved out so as to abut or engage the stopper 32. This will operate to prevent noise stemming from repeated impingement of the counterweight 19 on the stopper 26, for reasons similar to those described previously, by virtue of the fact that the outer end of the spiral bimetallic member 22 will be limited in its movement between two end positions identified by the angle θ.

As will be apparent from the foregoing description, after the heating control valve 13 has assumed its open position, the spiral bimetallic member 22 may be deformed to a given extent without being hampered within this limited deformation. However, excessive stress will not be exerted on the spiral bimetallic member 22 since the member will be free from irreversible or permanent deformation because excessive deformation in response to thermal conditions will be prevented. This will ensure proper functioning of the heating control valve. Furthermore, when the ambient temperature exceeds a given level, the hooked engaging member may abut and engage the stopper 26 or 32, as may be appropriate, and in this manner the shaft 15 will be held in a substantially fixed position so that no danger of noise created due to impingement of the counterweight 19 on the stopper 26 will occur.

Furthermore, the hooked engaging member 29 being made of a material having a low thermal conductivity will not promote heat transfer from the engaging member 29 to the spiral bimetallic member 22 and as a result the member 22 will be protected from the influence of heat from exhaust gases at a high temperature.

While specific embodiments of the invention have been shown and described in detail to illustrate the application of the inventive principles, it will be understood that the invention may be embodied otherwise without departing from such principles.

What is claimed is:

1. A system for heating the intake fuel mixture of an internal combustion engine having an intake manifold comprising means for delivering exhaust gases of said internal combustion engine into heat exchange relationship with said intake manifold to heat intake fuel mixture flowing therethrough, a valve for controlling flow of said exhaust gases, a rotatably mounted shaft having said valve secured thereto, a counterweight secured to said shaft to induce rotation thereof, stopper means located to be engaged by said counterweight in order thereby to limit the extent of rotation of said shaft induced by said counterweight, a spiral bimetallic member having an inner end and an outer end, said inner end being secured to said shaft to effect rotation thereof in response to ambient temperature conditions, said outer end being adapted to engage said stopper means to limit movement of said outer end of said bimetallic member in a first direction during engine warm up condition at relatively low ambient temperatures, and engagement means secured to said bimetallic member and adapted to engage said stopper means at relatively higher ambient temperature conditions in excess of a given temperature level to limit movement of said outer end of said bimetallic member in a direction opposite to said first direction.

2. A system according to claim 1 wherein said engagement means comprise an engaging member said stopper means and secured to said bimetallic member at a position spaced a distance from the outer end thereof.

3. A system according to claim 1 wherein said engagement means comprise an engaging member mounted on said bimetallic member and formed of material having a relatively low thermal conductivity.

4. A system according to claim 1 wherein said engagement means comprise an engaging member secured to said outer end of bimetallic member in back-to-back relationship therewith, and wherein said stopper means comprise two stopper members spaced a distance apart.

5. A system according to claim 1 wherein said stopper means comprise a single fixed stopper member, wherein said outer end of said bimetallic member is formed with a hooked configuration adapted to engage said stopper member on one side thereof when said outer end of said bimetallic member is moved in said first direction in response to ambient temperature conditions and wherein said engagement means comprise a hooked member attached to said bimetallic member at a point spaced from said outer end thereof, said hooked member being adapted to engage said stopper member on the side thereof opposite the side engaged by said hooked outer end in order to limit movement of said outer end of said bimetallic member in a direction opposite to said first direction.

6. A system according to claim 1 wherein said stopper means comprise a pair of stopper members located a predetermined distance apart, wherein said outer end of said bimetallic member is formed with a hooked configuration adapted to engage one of said stopper members in order to limit movement of said outer end of said bimetallic member in a first direction and wherein said engagement means comprise a hooked member attached to said outer end of said bimetallic member and adapted to engage the other of said stopper members in order to limit movement of said outer end in a direction opposite to said first direction.

* * * * *

UNITED STATES PATENT OFFICE
CERTIFICATE OF CORRECTION

Patent No. 4,187,815      Dated Feb. 12, 1980

Inventor(s) Toshikiko Kobayashi et al

It is certified that error appears in the above-identified patent and that said Letters Patent are hereby corrected as shown below:

Claim 2, line 2, after "engaging member" insert the word "engaging"

Claim 4, line 3, before "bimetallic member" insert the word "said"

*Signed and Sealed this*

*Twenty-seventh* Day of *May 1980*

[SEAL]

*Attest:*

SIDNEY A. DIAMOND

*Attesting Officer*     *Commissioner of Patents and Trademarks*